United States Patent
Cox et al.

(10) Patent No.: US 7,773,516 B2
(45) Date of Patent: Aug. 10, 2010

(54) FOCUSED FUNCTION NETWORK PROCESSOR

(75) Inventors: Dennis Cox, Austin, TX (US); Michael Moriarty, Austin, TX (US)

(73) Assignee: Breakingpoint Systems, Inc., Austin, TX (US)

( * ) Notice: Subject to any disclaimer, the term of this patent is extended or adjusted under 35 U.S.C. 154(b) by 833 days.

(21) Appl. No.: 11/560,710

(22) Filed: Nov. 16, 2006

(65) Prior Publication Data

US 2008/0117818 A1     May 22, 2008

(51) Int. Cl.
    *H04J 1/16*     (2006.01)
(52) U.S. Cl. ........................ 370/231; 370/235
(58) Field of Classification Search .......... 370/231, 370/230, 229, 401, 389, 466, 467, 392, 428, 370/429, 412, 465, 469, 471, 470, 476, 394, 370/400, 415, 395.4, 395.72, 395.71, 235; 709/238, 244
    See application file for complete search history.

(56) References Cited

U.S. PATENT DOCUMENTS

| | | | | |
|---|---|---|---|---|
| 6,560,233 B1 * | 5/2003 | Hatanaka et al. | ............ | 370/401 |
| 7,463,628 B2 * | 12/2008 | Parker et al. | ................ | 370/392 |
| 7,493,408 B2 * | 2/2009 | Chang et al. | ................ | 709/232 |
| 7,496,034 B2 * | 2/2009 | Fukunaga et al. | ........... | 370/230 |
| 7,496,109 B1 * | 2/2009 | Gupta et al. | ................ | 370/413 |

* cited by examiner

*Primary Examiner*—Chi H Pham
*Assistant Examiner*—Alexander Boakye
(74) *Attorney, Agent, or Firm*—Baker Botts L.L.P.

(57) ABSTRACT

A network processor is enabled to retrieve a packet transmission data structure (PTD) from a memory. The NP parses packet data from the PTD and transmits the data over the network as a network packet. The PTD may include repetition information used by the NP to transmit a plurality of packets. The PTD use transmission interval information to control transmission timing of consecutive network packets. The PTD may include modification information used to modify the data packet portion. The modification may include incrementing, decrementing, or storing a random number into any portion of the data packet. The PTD may include flow control information to determine the next PTD to process. The flow control information may include criteria including acknowledgement criteria and time delay criteria. The packet data portion preferably includes all formatting information applicable to the network.

14 Claims, 6 Drawing Sheets

| Address | Field |
|---|---|
| 0x0NN00000 | LENGTH OF DATA FIELD (611) |
| 0x0NN01000 | START OF PACKET DATA (410) |
| 0x0NN04FFF | END OF PACKET DATA (410) |
| 0x0NN05000 | NO. OF PACKETS (613) |
| 0x0NN05004 | TRANSMISSION INTERVAL BTW PACKETS (614) |
| 0x0NN05040 | DESTINATION PORT NO. (615) |

. . .

| | |
|---|---|
| 0x0NN06000 | TRANSMITTED PACKETS (621) |
| 0x0NN06004 | RECEIVED PACKETS (622) |
| 0x0NN06008 | DROPPED PACKETS (623) |
| 0x0NN0600C | UNKNOWN PACKETS (624) |
| 0x0NN06014 | MAX LATENCY (MICROSECONDS) (625) |
| 0x0NN06018 | MIN LATENCY (MICROSECONDS) (626) |
| 0x0NN0601C | AVG LATENCY (MICROSECONDS) (627) |

. . .

| | |
|---|---|
| 0x0NN07000 | START BYTE (631) |
| 0x0NN07004 | LENGTH/NO. OF BYTES (632) |
| 0x0NN07008 | OP (INC, DEC, RDM) (633) |

. . .

| | |
|---|---|
| 0x0NN07100 | START BYTE |
| 0x0NN07104 | LENGTH/NO. OF BYTES |
| 0x0NN07108 | OP (INC, DEC, RDM) |

| | |
|---|---|
| 0x0NN0700C | START OF WRITE LOCATION (801) |
| 0x0NN07010 | NO. OF BYTES (802) |
| 0x0NN07014 | NEXT PTD (803) |
| 0x0NN07018 | NEXT PTD (ALT) (804) |

FIG. 10

PTS INSTRUCTION SET / OP CODE LISTING    1100

STATELESS INSTRUCTIONS (1110)
    INCREMENT DEFINED FIELD IN NETWORK PACKET
    DECREMENT DEFINED FIELD IN NETWORK PACKET
    WRITE RDM TO DEFINED FIELD IN NETWORK PACKET
    CALC IP CHK SUM FOR DEFINED FIELD IN NETWORK PACKET
    CALC TCP CHK SUM FOR DEFINED FIELD IN NETWORK PACKET
    CALC ETHERNET CHK SUM FOR DEFINED FIELD IN NETWORK PACKET

BRANCH ON ACK INSTRUCTIONS (1120)
    INCREMENT DEFINED FIELD IN NETWORK PACKET
    DECREMENT DEFINED FIELD IN NETWORK PACKET
    WRITE RDM TO DEFINED FIELD IN NETWORK PACKET
    CALC IP CHK SUM FOR DEFINED FIELD IN NETWORK PACKET
    CALC TCP CHK SUM FOR DEFINED FIELD IN NETWORK PACKET
    CALC ETHERNET CHK SUM FOR DEFINED FIELD IN NETWORK PACKET

BRANCH ON ACK INSTRUCTIONS WITH TIMEOUT (1130)
    INCREMENT DEFINED FIELD IN NETWORK PACKET
    DECREMENT DEFINED FIELD IN NETWORK PACKET
    WRITE RDM TO DEFINED FIELD IN NETWORK PACKET
    CALC IP CHK SUM FOR DEFINED FIELD IN NETWORK PACKET
    CALC TCP CHK SUM FOR DEFINED FIELD IN NETWORK PACKET
    CALC ETHERNET CHK SUM FOR DEFINED FIELD IN NETWORK PACKET

BRANCH ON ACK INSTRUCTIONS WITH FAILOVER (1140)
    INCREMENT DEFINED FIELD IN NETWORK PACKET
    DECREMENT DEFINED FIELD IN NETWORK PACKET
    WRITE RDM TO DEFINED FIELD IN NETWORK PACKET
    CALC IP CHK SUM FOR DEFINED FIELD IN NETWORK PACKET
    CALC TCP CHK SUM FOR DEFINED FIELD IN NETWORK PACKET
    CALC ETHERNET CHK SUM FOR DEFINED FIELD IN NETWORK PACKET

FIG. 11

FOCUSED FUNCTION NETWORK PROCESSOR

BACKGROUND

1. Field of the Present Invention

The present invention generally relates to the field of data communication systems or network and, more particularly, devices designed for processing packet switched network communication.

2. History of Related Art

A network processor generally refers to one or more integrated circuits having a feature set specifically targeted at the networking application domain. In contrast to general purpose central processing units (CPUs), network processors are special purpose devices designed to perform a specified task or group of related tasks efficiently.

The majority of modern telecommunications networks are referred to as packet switching networks in which information (voice, video, data) is transferred as packet data rather than as the analog signals that were used in legacy telecommunications networks, sometimes referred to as circuit switching networks, such as the public switched telephone network (PSTN) or analog TV/Radio networks. Many protocols that define the format and characteristics of packet switched data have evolved. In many applications including the Internet and conventional Ethernet local area networks, multiple protocols are employed, typically in a layered fashion, to control different aspects of the communication process. Some protocols layers include the generation of data (e.g., a checksum or CRC code) as part of the network processing.

Historically, the relatively low volume of traffic and the relatively low speeds or data transfer rates of the Internet and other best-efforts networks were not sufficient to place a significant packet processing burden on the CPU of a network connected device. However, the recent enormous growth in packet traffic combined with the increased speeds of networks enabled by Gigabit and 10 Gigabit Ethernet backbones, Optical Carriers, and the like have transformed network processing into a primary consideration in the design of network devices. For example, Gigabit TCP (transmission control protocol) communication would require a dedicated 2.4 MHz Pentium® class processor just to do software-implemented network processing. Network processing devices have evolved as a necessity for offloading some or all of the network processing overhead from the CPU to specially dedicated devices. These dedicated devices may be referred to herein as network processors.

Unfortunately, existing network processor designs tend to suffer from at least one of two design flaws. At one extreme, a "very dedicated" design is used to implement a network protocol in hardware. While devices that have highly dedicated hardware designs are capable of being highly efficient, the devices may become obsolete whenever the protocol is changed or modified to fix a bug, improve performance, address a security issue, or for any other reason. At another extreme, less specific processors, such as any of a series of embedded processors including, for example, the IXP family of embedded processors from Intel Corporation, are used to implement network processing. Network processing solutions that use these solutions, however, tend to require a great deal of programming by programmers having specific knowledge of the hardware that implements the protocol. This leads to long learning curves that result in increased implementation and maintenance costs.

It would be desirable to implement a network process capable of achieving the efficiency of highly dedicated hardware designs and the programmability of embedded processor implementations. In addition, it would be desirable to implement the network processor with a highly efficient instruction set and program execution paradigm that simplified the programming and made programming largely a platform independent exercise. In addition, it would be still further desirable if the implementation facilitated reduced memory consumption and/or or increased memory conservation.

SUMMARY OF THE INVENTION

The indicated objectives are addressed by a network processor as described below. A network processor is enabled to retrieve a packet transmission data structure (PTD) from a memory. The NP parses packet data from the PTD and transmits the data over the network as a network packet. The PTD may include repetition information used by the NP to transmit a plurality of packets. The PTD use transmission interval information to control transmission timing of consecutive network packets. The PTD may include modification information used to modify the data packet portion. The modification may include incrementing, decrementing, or storing a random number into any portion of the data packet. The PTD may include flow control information to determine the next PTD to process. The flow control information may include criteria including acknowledgement criteria and time delay criteria. The packet data portion preferably includes all formatting information applicable to the network.

The PTD may be a fixed length structure according to a defined format. The PTD may include packet transmission information, transmission statistics information, modification and flow control information. The packet transmission information may include the packet data as well as information indicating a transmission port and a transmission interval. The transmission information may include information indicating the length of the packet data portion. The transmission statistics information may include information generated by the PT such as the number of packets transmitted, the number of packets successfully acknowledged, and information indicative of the minimum, maximum, and average latency associated with each transmission. The modification and flow control information may by used by the PT to modify the packet data and to control a sequence in which one or more PTDs are processed by the PT. The modification information may include information indicating a modification operation to be performed on the packet data portion of a PTD. The PT may support a limited set of operations including, as examples, an increment operation, a decrement operation, and a random number operation. The modification information may further include information indicating a specific portion of the packet data to modify.

BRIEF DESCRIPTION OF THE DRAWINGS

Objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the invention is limited only by the language of the appended claims.

DETAILED DESCRIPTION OF THE INVENTION

In one aspect, a network processor for generating network packets suitable for transmission over a data processing network includes a memory access module, a packet transfer data structure (PTD) processing module, and a transmission module all operatively connected to a control module. The network processor preferably has access to a network processor memory. A portion of the network processor memory, referred to herein as the network processing block of network processor memory, includes one or more PTDs. A PTD preferably includes a packet data portion that represents a network packet to be transmitted over the network. The network processor is configured to retrieve a PTD from the PT block of NP memory. A control unit of the NP causes a PTD processing module to parse the packet data from the PTD. The packet data is then forwarded to a transmission module. The control unit then invokes the transmission module to transfer the packet data over the network as a network packet.

The PTD may include information in addition to the packet data. For example, the PTD may also include information that defines the location and address boundaries of the PTD. The PTD may include information useable by the control unit to control the transmission of the packet data over the network. The PTD may include, for example, information to indicate how many packets the NP is to transmit and information controlling the amount of delay between each packet transfer. The PTD may further include operation code (op code) information useable by the NP to modify the packet data, such as by incrementing, decrementing, or random number generating. Some opcodes may cause the NP to generate a checksum value according to a specified format and store the checksum in the PTD. Using this op code information, the NP may transmit the packet data in a PTD as a network packet, modify the packet data according to an op code in the PTD, and transmit the modified packet data as the next network packet. The PTD may further include information enabling the NP control unit to control the sequence in which PTDs in the NP memory are executed. For example, the op code of a PTD may be a "state" op code that specifies, in addition to an operation to perform on the packet, a next PTD to process if the current network packet is not properly acknowledged or not properly acknowledged within a specified period of time.

Preferably, the set of op codes supported by the NP is highly focused and limited to the task of generating packets for transmission on a network. In some embodiments, for example, the operations recognized by the NP that alter the packet data content are limited to an increment operation, a decrement operation, a random number generating operation, and one or more checksum generating operations. The data modification operations may be executed with or without flow control conditions that affect the determination of the next PTD to process. The limited instruction set is used in conjunction with a highly formatted data structure definition to simplify the design of NP. In such embodiments, the NP executes one of the limited set of data modification operations to generate packets to be transmitted over the network.

The NP may be used in conjunction with a PT block configuration module. The PT block configuration module operates on packet transfer "source code" to create one or more PTDs that may be processed by the network processor. The PT block configuration module incorporates substantially all formatting required by the network protocol implementation. In this manner, the packet data stored in a PTD is preferably suitable for transmission over the network without substantial modification. The packet data stored in a PTD might include, for example, all headers required by the protocol stack that is associated with the network over which the packets are to be transmitted. The NP is, therefore, freed of the constraints and implications of the protocol implementation. Instead, the NP is indifferent to the specifics of the network implementation. All network implementation are accounted for by the PT block configuration code so that the packet data stored in a PTD is compatible with the network over which the NP is transmitting packets.

Figure 1:
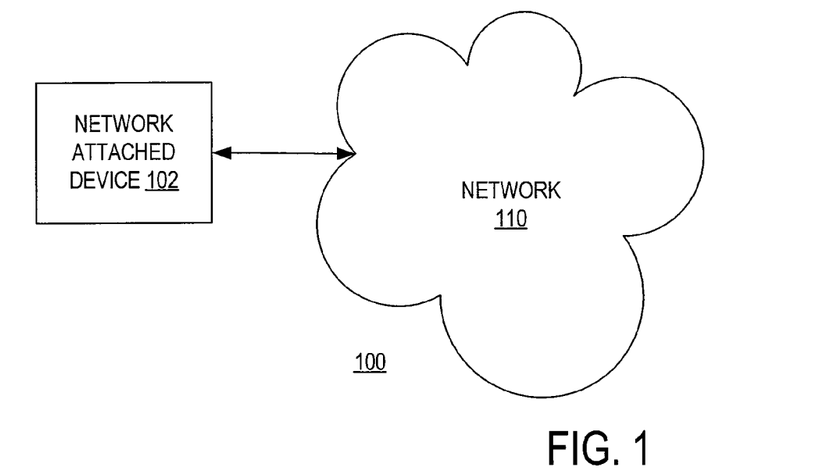
FIG. 1 is a block diagram of selected elements of a data processing network showing a network attached device connected to a network.

Referring now to the drawings, FIG. 1 depicts a data processing system 100 including a network attached device 102 connected to a network 110. As suggested by its name, network attached device 102 represents any of a wide variety of network aware devices. Network attached device 102 may be implemented as a server class, desktop, or laptop computer. In other embodiments, network attached device is implemented as a stand alone network device such as a gateway, network router, network switch, or other suitable network device. Similarly, network 110 may include Ethernet and other familiar local area networks as well as various wide area networks including the Internet. Network 110 includes, in addition to one or more physical network medium, various network devices such as gateways, routers, switches, and the like.

As depicted in FIG. 1, network attached device 102 is emphasized as a device that receives information from network 110 or devices (not depicted) within network 110 and transmits information to network 110. For use in conjunction with a network processor as described below, data processing network 110 is preferably implemented as a packet switched network. In a packet switched network, units of information referred to as packets are routed between network nodes over network links shared with other traffic. Packet switching is desirable for its optimization of available bandwidth, its ability to reduce perceived transmission latency, and its availability or robustness. In packet switched networks including the Internet, information is split up into discrete packets. Each packet includes a complete destination address and is individually routed to its destination.

Figure 2:
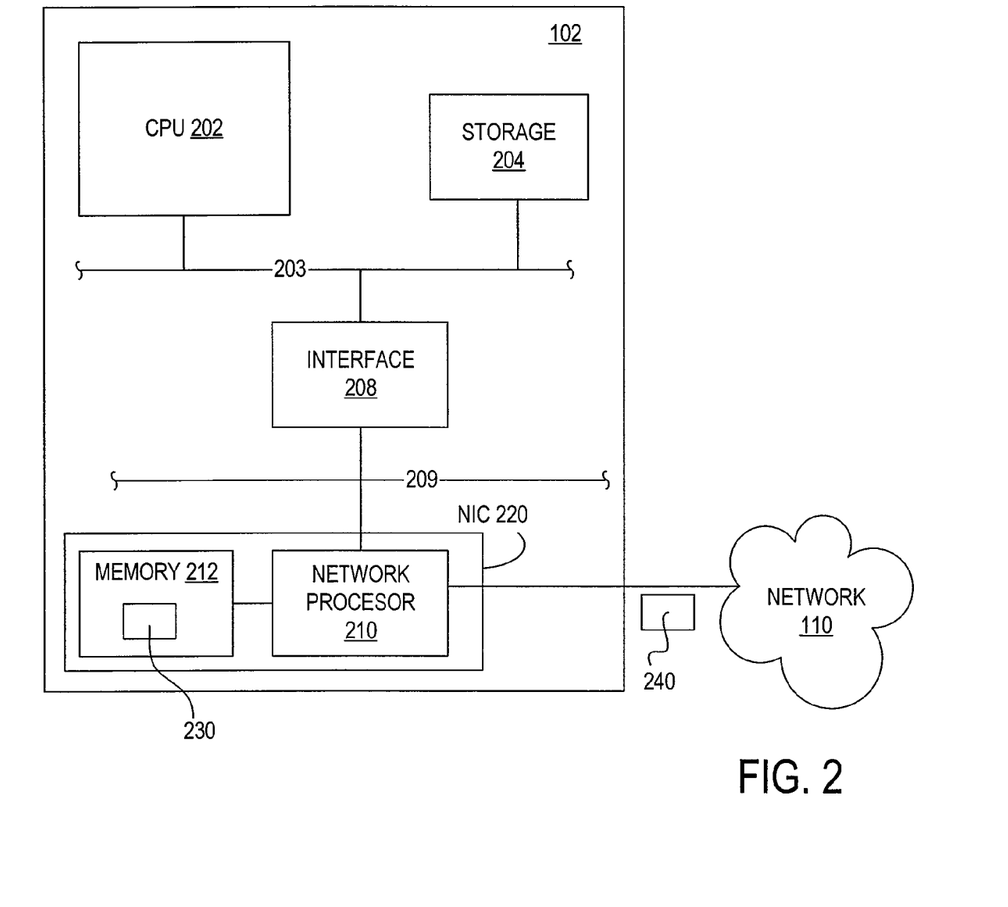
FIG. 2 is a block diagram of a selected elements of an embodiment of a networked attached device of FIG. 1 emphasizing a network processor implemented on a network interface card (NIC)

Referring now to FIG. 2, selected elements of some embodiments of network attached device 102 of FIG. 1 are shown. The implementation of network attached device 102 as depicted in FIG. 2 is representative of server class embodiments. In such embodiments, network attached device may include a general purpose central processing unit (CPU) 202 and a special purpose or focused function network processor (NP) 210. CPU 202 is shown as connected to a system bus 203 to which a storage medium is also operatively coupled although, in other embodiments, one or more intermediate interconnects or interconnect links may exist between CPU 202 and storage 204. Storage 204 encompasses volatile system memory (e.g., DRAM) of CPU 202 as well as any non-volatile or persistent storage of network attached device 102. Persistent storage includes, but is not limited to, traditional magnetic storage medium such as hard disks.

A bridge or interface 208 is shown in FIG. 2 as connected between system bus 203 and a peripheral or I/O bus 209. I/O bus 209 may represent, as an example, a PCI (peripheral components interface) bus. In this embodiment, NP 210 and an NP memory 212 may be a part of an adapter card or other peripheral device such as a network interface card (NIC) 220. In other embodiments, however, network attached device 102 may be a stand-alone device such as a network router in which network processor 102 may represent the primary processing resource.

Regardless of the specific implementation, network attached device 102 includes an NP 210 that is responsible for at least a portion of the network packet processing and packet transmission performed by network attached device 102. NP 210 is a special purpose integrated circuit designed to perform packet processing efficiently. NP 210 includes features or architectures to enhance and optimize packet processing independent of the network implementation or protocol. NP 210 may be used in various applications including, without limitation, as network routers or switches, firewalls, intrusion detection devices, intrusion prevention devices, and network monitoring systems as wells as in conventional Network Interface Cards to provide a network processing offload design.

The embodiments of NP 210 described herein emphasize NP 210 as dedicated purpose device that operates independently of the implementation and protocol specifics of network 110. In some embodiments, NP 210 supports a focused and limited set of operation codes (op codes) that modify packet data that is to be transmitted over network 110. In these embodiments, NP 210 may operate in conjunction with a data structure referred to herein as a packet transfer data structure (PTD) 230. A PTD 230 may be implemented as a relatively rigidly formatted data structure that includes information pertaining to various aspects of transmitting packets over a network. NP 210 preferably incorporates inherent knowledge of the PTD format. At least one PTD 230 is stored in NP memory 212 at a location or address that is known by NP 210. NP 210 preferably retrieves a PTD 23 from NP memory 212 and generates one or more network packets 240 to transmit across network 110. NP 210 generates network packets 240 based on information stored in PTD 230. As suggested earlier, some embodiments of NP 210 locate packet data stored in a PTD 230, parse the packet data, and transmit the parsed data, substantially without modification, as a network packet 240. NP 210 preferably also includes support for a processing a limited set of op codes, stored in PTD 230, that instruct NP 210 to modify PTD packet data in a specified way. The number of op codes and supported data modification operations supported by PT 210 is preferably less than thirty two and still more preferably less than approximately ten or so. The data modification operations may, for example, be limited to incrementing, decrementing, and generating random numbers for a portion of the packet data as well as calculating and storing checksums according to various protocols.

Figure 3:
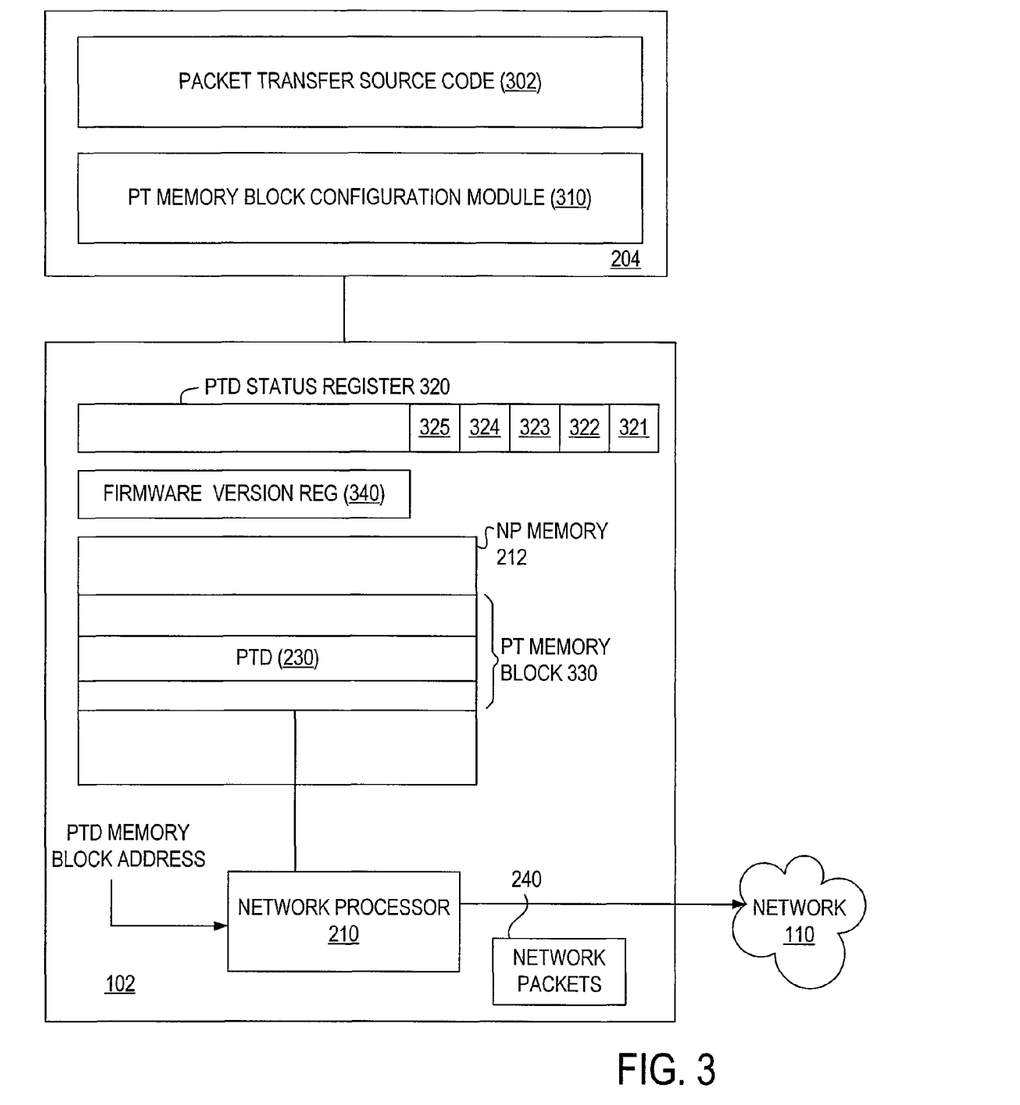
FIG. 3 is a block diagram of emphasizing selected elements of an embodiment of the network attached device of FIG. 2.

Turning now to FIG. 3, selected elements of network attached device 102 as depicted in FIG. 2 are shown to emphasize at least a portion of the software elements that may be employed by or incorporated within network attached device 102. As depicted in FIG. 3, network attached device 102 includes packet transfer source code 302 and a PT memory block configuration module 310 stored in storage 204. Packet transfer source code 302 represents any form of command or other operation that, when executed or processed, results in the transmission of one or more packets on a network. As an example, source code 302 may include or represent HTTP request methods and/or responses to such request methods. When the HTTP request methods or responses are processed by a network attached device, the device transmits one or more packets over the network between the requesting client and the server. Source code 302 may be pre-stored or generated at run time, such as during operation of a web server. In this embodiment, CPU 202 of network attached device may generate HTTP responses in a high level format, including, as an example, a human readable format. This high level response may be stored in persistent or volatile portions of storage 204 for processing.

Configuration module 310 represents code that transforms text or other high level representation of a packet producing response, reply, request, command, or other instruction. In the context of network attached device 102, configuration module 310 has knowledge of the network implementation including details of the network protocol stack employed by network attached device 102. PT block configuration module processes packet transfer source code 302 to produce packet data. The packet data produced by configuration module 310 is preferably fully formatted for transmission over network 110 as a network packet. PT block configuration module is preferably also aware of the format of PTDs and the location of PT memory block 330.

Configuration module 310 preferably operates on packet transfer source code 302 to produce data suitable for storage as at least a portion of a PTD 230 stored in PT memory block 330 of NP memory 212. For example, configuration module 310 preferably generates a packet data portion 410 (discussed below) of PTD 230 based on the content of PT transfer source code 302 and the specific implementation of network 110. Configuration module 310 may also generate other portions of PTD 230 including, as an example, a packet modification and flow control portion 630 (discussed below) of PTD 230 that indicates operations that may be employed by NP 210 to modify data packet portion 410.

FIG. 3 depicts a PTD status register 320. In some embodiments, a single status register contains a status for all packets to be transmitted by NP 210. PTD status register 320 may include, as examples, five defined bits, namely, an editing bit 321, a start bit 322, a running bit 323, a done bit 324, and a stop bit 325.

Editing bit 321 may be read or written by configuration module 310 and read by NP 210 to indicate when configuration module 310 is modifying the PT memory block 330. Start bit 322 may be read or written by configuration module 310 and read by NP 210 to indicate to the NP 210 to start packet transmission. Running bit 323 indicates when NP 210 is transmitting packets. This bit may be read by configuration module 310 and read or written by NP 210. Done bit 324 may be read by PT configuration module 310 and read or written by NP 210 to indicate when transmission of network packets by NP 210 is complete. Stop bit 325 may be read by configuration module 310 and read or written by NP 210 to stop packet transmission by NP 210.

In this embodiment, processing a PTD 230 might include configuration module 310 setting editing bit 321 while it writes or otherwise stores a PTD 230 in PT memory block 330 of NP memory 212. When editing is complete, configuration module 310 sets start bit 322. In response to start bit 322 being set by configuration module 310, NP 210 sets running bit 323 to indicate that it is transmitting one or more packets over configuration module 110. When transmission of packets completes, NP 210 clears running bit 323 and sets done bit 324. Status register 320 may be a 32-bit register in which the remaining 27 bits are undefined or defined for use in conjunction with some other purpose. The depicted embodiment, for example, includes a firmware version register 340. Firmware version register 340 depicted in FIG. 3 is preferably a 32-bit register that indicates the firmware version of NP 210.

Figures 4, 5:
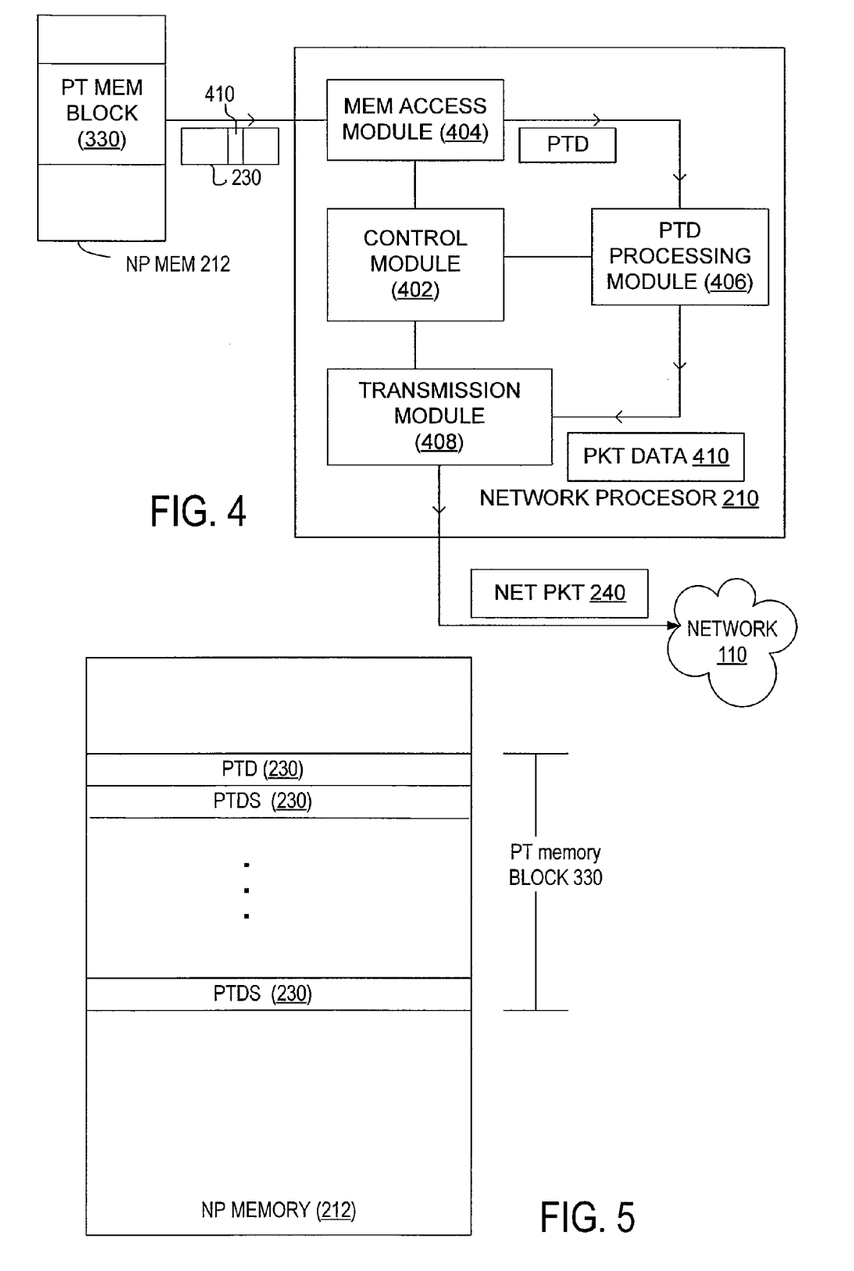
FIG. 4 illustrates additional detail of an embodiment of the network processor of FIG. 2.
FIG. 5 illustrates an implementation of network processor memory emphasizing a packet transfer (PT) memory block containing a plurality of packet transfer data structures (PTDs)

FIG. 3 emphasizes network processor 210 accessing PT memory block 330 in NP memory 212 to retrieve and process a PTD 230 to generate and transmit networks packets 240 on network 110. Turning now to FIG. 4, selected elements of some embodiments of NP 210 are depicted. In the depicted embodiment, NP 210 includes a control unit 402 that is connected to a memory access module 404, a PTD processing module 406, and a transmission module 408. NP 210 may be implemented using field programmable gate array logic (FPGA) or as an application specific integrated circuit having a dedicated set of fabrication masks.

Memory access module 404 of NP 210 as depicted in FIG. 4 is responsible for accessing a memory such as NP memory 212 to retrieve a PTD 230 from a PT memory block 330 stored in NP memory 212. PTD processing module 406 is enabled to parse one or more fields or other portions of PTD 230. For example, PTD 230 may include packet data 410 and PTD processing module 406 is responsible for extracting packet data 410 from PTD 230. Transmission module 408 is enabled to transmit packet data 410 as a network packet 240 across network 110 to which NP 210 is connected.

Control module 402 coordinates the activity of memory access module 404, PTD processing module 406, and transmission module 408. Control module 402 sends a signal to or otherwise instructs memory access module 404 to retrieve PTD 230 from NP memory 104 and to forward the PTD 230 to PTD processing module 406. Control module 402 then requests PTD processing module 406 to parse packet data 410 and any other data in PTD 230 and forward all or some of the parsed data to transmission module 408. Control module 408 then invokes transmission module 408 to transmit packet data 410 received from PTD processing module 406 as a network packet 240.

Referring now to FIG. 5, FIG. 6, FIG. 7, and FIG. 8, a conceptual representation of PT memory block 330 and exemplary implementations of PTD 230 are shown. In the depicted implementation, PT memory block 330 represents at least a portion of NP memory 212. PT memory block 330 is preferably a contiguous block of NP memory 212 beginning at a predetermined address of NP memory 212. The address at which PT memory block 330 begins is known to NP processor 212 and PT memory block configuration unit 302.

In the depicted implementation, PT memory block 330 includes a plurality of PTDs 230. In some embodiments, each PTD 230 occupies the same amount of NP memory 212 and the PTDs 230 are arranged adjacent to each other so that the ending address of one PTD is the start address for the next PTD. In some embodiments, each PTD 230 is preferably large enough to store a 9 Kb packet data, predetermined packet transmission statistics that may be generated by NP 210, and one or more PTD modification extensions, each of which may be consume multiple bytes. In some embodiments, each PTD 230 is a 1 Mb structure that is aligned to megabyte boundaries of PT memory 212. In some embodiments, the starting byte address for PT memory block 330 and the starting byte address for the first PTD 230 is 0x00100000, with subsequent PTDs 230 being stored at byte addresses, 0x00200000, 0x00300000, etc. The number of PTDs 230 is an implementation detail, but an exemplary implementation may include, for example, sufficient memory storage for 127 PTDs 230. Other embodiments may include more or fewer PTDs 230 in PT memory block 330. Also, the size of each PTD is an implementation detail and other implementations may employ PTDs that are larger or smaller than the 1 Megabyte PTDs 230 described herein. For the exemplary implementation supporting 127 PTDs 230, each requiring 1 Megabyte of storage, NP memory 212 requires 128 Megabytes with the first megabyte of storage being reserved for NP 210 scratch memory or other suitable purpose and the remaining 127 Megabytes dedicated to PTDs 230. It will be appreciated by those skilled in the field of network processing that the configuration NP 210 facilitates a representation of a large number of network packets in a relatively compact area of system memory. A single PTD 230 as described herein, for example, consumes 1 MB or less of system memory, but is capable of representing data packets that would require substantially more memory to store in their literal form.

Figure 6:
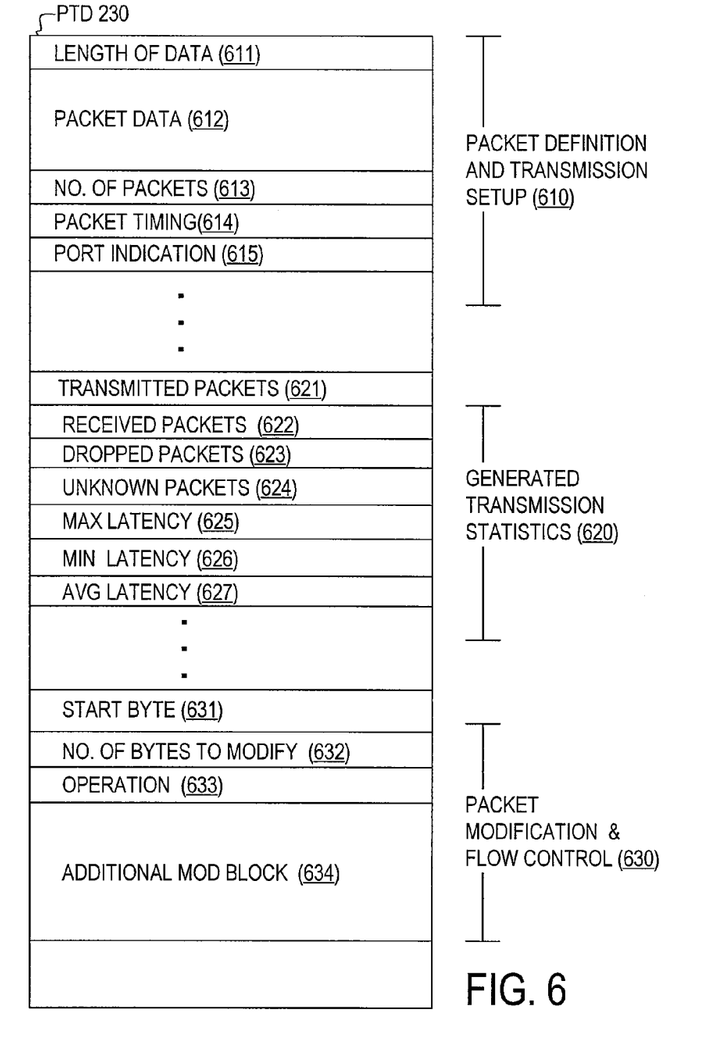
FIG. 6 is a conceptual illustration of an exemplary implementation of the PTD of FIG. 5.

Referring to FIG. 6, an exemplary implementation of a PTD 230 is shown. In the depicted implementation, PTD 230 includes a first portion referred to as packet definition and transmission setup information 610, a second portion referred to as transmission statistics information 620, and a third portion referred to as packet modification and flow control information 630. Other implementations of PTD 230 may include or omit some of these portions and may include portions not depicted herein.

As depicted in FIG. 6, packet definition and transmission setup information 610 includes a variable sized packet data 410 and information from which NP 210 can determine the precise boundaries of packet data 410. In some embodiments, packet data 410 begins at a known address offset relative to the beginning address of PTD 230. A length-of-data field 611 is used to indicate the length of packet data 410. Length-of-data field 611 is preferably a 32-bit (4-byte) field indicating the number bytes consumed by packet data 410. This implementation supports a packet data size as large as 4 Gigabytes although actual packet sizes for use in packet switched networks will preferably be substantially smaller. For example, a maximum size of packet data 410 will be in the range of approximately 1 to 1024 Kbytes.

Packet definition and setup information 610 as shown in FIG. 6 includes a number-of-packets field 613, a packet timing field 614, and a port indication 615. Number-of-packets fields 613 may be a 32-bit indication of the number of times that NP 210 will transmit the packet data onto the network. A "magic packet" used in devices that support wake-on-LAN, for example, contains a defined constant, followed by sixteen repetitions of a target device's MAC (media access control) address. Number-of-packets field 613 may be used to simplify the representation of such a sequence of packets. Packet timing field 614 may specify a value, expressed in a standardized unit such as microseconds or milliseconds, used by NP 210 to control the transmission of packets. For example, packet timing field 614 may represent a minimum delay between transmission of sequential packets. In this embodiment, packet timing field 614 may be used to slow the speed at which NP 210 transmits data. Port indicator 615 specifies the physical port over which NP 210 transmits the corresponding data.

PTD 230 as shown in FIG. 6 supports the creation and storage of packet transmission statistics generated by NP 210 via transmission statistics information 620 of PTD 230. Transmission statistics information 620 as shown, for example, includes fields for recording the number of packets transmitted (field 621), the number of transmitted packets that were acknowledged or successfully received, (field 622), the number of packets that were dropped, i.e., not successfully acknowledged (field 623), the number of transmitted packets with an unknown termination status (field 624), the maximum latency that was observed in the transmitted packets (field 625), the minimum latency observed in the transmitted packet (field 626), and the average latency (field 627). Other implementations of PTD 230 may include more or fewer packet transmission statistics without departing from the scope of the described PTD 230.

PTD 230 preferably supports a focused set of operations to modify the content of the packet data 410 and to control the flow or sequence in which the PTDs are executed or processed by NP 210. Data modification and flow control is represented in packet modification and flow control information 630 of PTD 230. Packet modification and flow control information 630 is used to specify which portions of packet data 410 will be modified by the applicable data modification operation. As depicted in FIG. 6, for example, packet modification and flow control information 630 includes a start byte field (631) and a number of bytes field (632) that, together, specify a portion of packet data 410 to be modified by the applicable operation, which is indicated in operation field 633. If, for example, start byte 631 contains the value 40 and number of bytes field 632 contains the value 100, the applicable data modification operation will operate on the 100-byte value that begins at the address 40 bytes from the starting address of packet data 410. In some embodiments, the operations that NP 210 may perform on packet data 410 or specified portions of packet data 410 include an increment operation, a decrement operation, and a random number operation.

Figure 7:
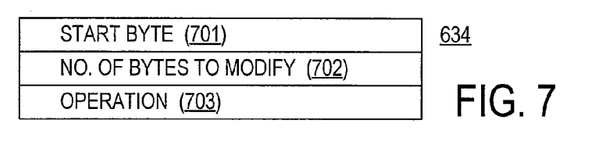
FIG. 7 illustrates an embodiment of an additional modification block of the PTD of FIG. 6.
Figure 8:
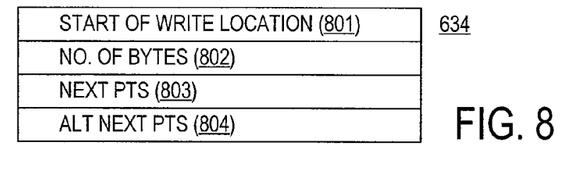
FIG. 8 illustrate an alternative implementation of the additional modification block of the PTD of FIG. 6.

Packet modification and flow control information as depicted in FIG. 6 further includes a section identified as additional modification block 634. As implied by its name, additional modification block 634 may define one or more additional modification and/or flow control operations. FIG. 7 and FIG. 8 depict two different types of additional modification blocks 634. Additional modification block 634 as depicted in FIG. 7 includes a start byte field 701, a number of bytes field 702 and an operation field 703 the same as fields 631 through 633 as depicted in FIG. 6. Additional modification block 634 as depicted in FIG. 8, includes a start byte field 801, a number of bytes field 802, a next PTD field 803, and an alternate next PTD field 804. Next PTD field 803 and alternate next PTD field 804 indicate flow control information by indicating which PTD 230 NP 210 should process next. Next PTD field 803 may, for example, indicate the next PTD 230 to process if the a network packet 240 generated using the current PTD 230 is transmitted and acknowledged successfully. Alternate next PTD field 804, on the other hand, may indicate the PTD 230 NP 210 is next to process if a network packet 240 generated during processing of the current PTD 230 is not successfully acknowledged or not successfully acknowledged within a specified time interval or other criteria.

Figure 9:
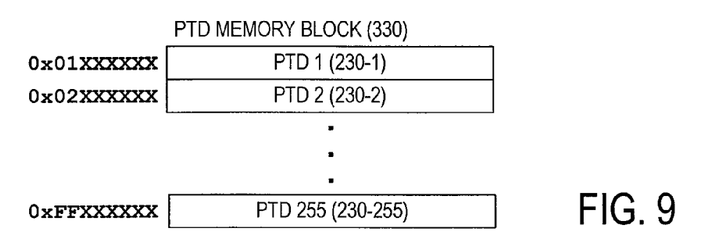
FIG. 9 illustrates an implementation of a PT memory block including exemplary memory addresses.

Referring now to FIG. 9, a representation of a PTD memory block 330 including exemplary system memory addresses is shown. In the depicted implementation, for example, PTD memory block 330 includes a first PTD 230-1 starting at system memory address 0x00100000, a second PTD 230-2 starting a system memory address 0x00200000, and so forth through a 255th PTD 230-255 starting at system memory address 0x0FF00000. This implementation of PTD memory block 330 includes 255 separately definable PTDs 230 stored in a 256 MB block of system memory reserving the first megabyte for defined uses.

Figure 10:
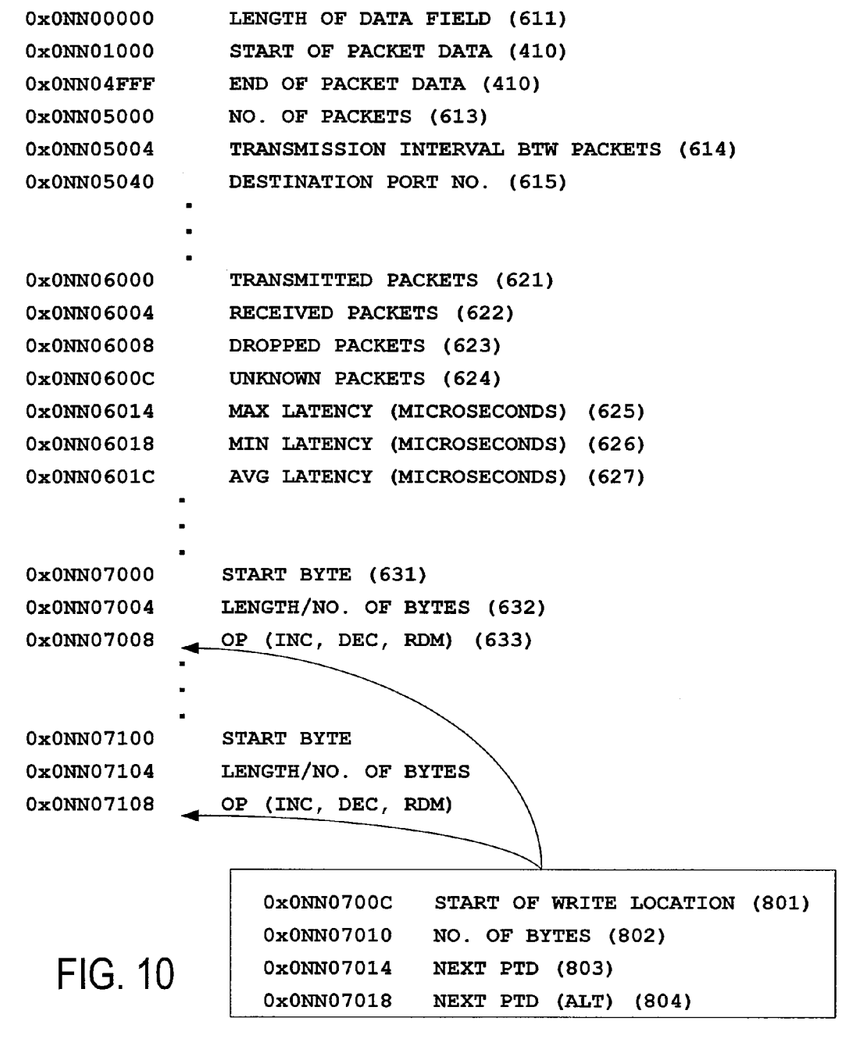
FIG. 10 illustrates additional detail, including exemplary memory addresses, for a PTD depicted in FIG. 9.

Referring now to FIG. 10, a representation of a PTD 230 is shown with exemplary system memory addresses for each of the data fields 611 through 634 shown in FIG. 6. In the depicted implementation, for example, packet definition and transmission information 610 begins at system memory address 0x0NN00000 (where NN indicates the corresponding PTD 230) and includes packet data 410 at system memory address 0x0NN01000 through 0x0NN04FFF, number of packets field 613 at system memory address 0x0NN05000 and so forth ad depicted. Packet transmission statistics information 620 including fields 621 through 627 is shown as occupying system memory beginning at system memory address 0x0NN06000, and modification and flow control information 630 is including fields 631 through 633 and optional additional modification blocks 634 as depicted in FIG. 8. It will be appreciated that the system memory addresses used in FIG. 10 are merely exemplary of a particular implementation and that other formats may different memory addresses to implement PTD 230.

Figure 11:
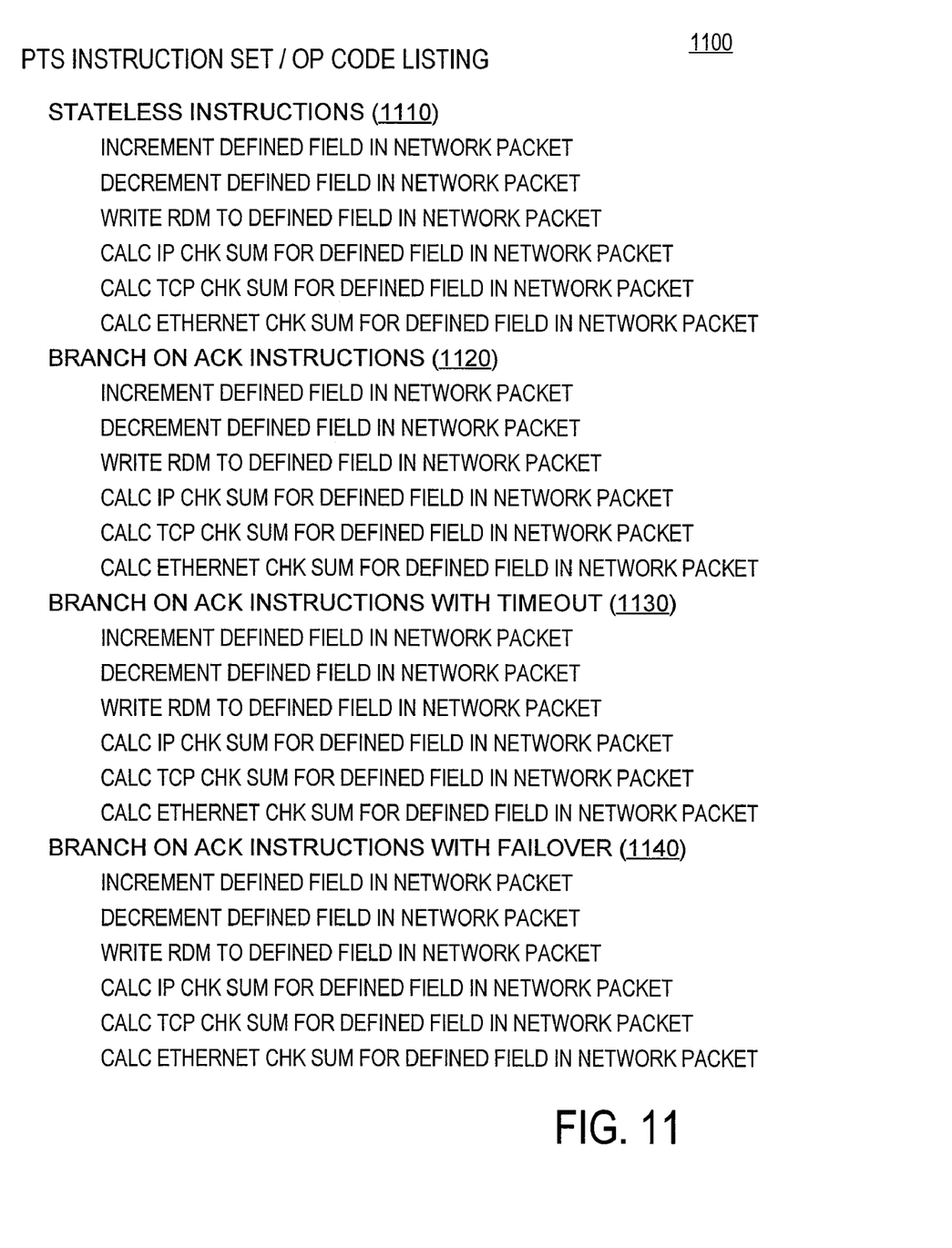
FIG. 11 lists an exemplary instruction set for some embodiments of the network processor of FIG. 4.

Referring now to FIG. 11, an exemplary instruction set 1100 is represented. Instruction set 1100 indicates the various operations that PT 210 supports. Instruction set 1100 as depicted includes four classes of instructions including a stateless instruction class 1110, branch on acknowledge class 1120, a branch on acknowledge with timeout class 1130, and a branch on acknowledge with failover class 1140. In the depicted implementation, each class of instructions includes a set of six operations, namely, increment defined field, decrement defined field, write random number to defined field, and three checksum operations, one for an IP checksum, one for a TCP checksum, and one for an Ethernet checksum.

Using this basic set of four instruction classes and six operations in each class, NP 210 is enabled to alter packet data 410 of a PTD 230 in ways that are most commonly encountered in real networks and provides NP 210 with a substantial amount of network processing capability using a very focused instructions set. Limiting the instruction sot to just six different operations as in the depicted embodiment enables a compact design that incorporates substantial network processing flexibility and functionality. Instruction class 1110 represents operations that execute unconditionally without regard to the acknowledgement status of transmitted packets. Branch on acknowledge instruction class 1120 define the flow control when packets are successfully acknowledged. Branch on acknowledge with timeout instruction class 1130 incorporate a timing criteria in which the acknowledgement of a transmitted packet must occur within a specified duration. In some implementations, the timeout criteria is evaluated using timestamp information contained in each packet. In other embodiments, more sophisticated timeout information may be employed. Instruction class 1140 incorporates a non-timing criteria into the evaluation of packet acknowledgement.

It should be appreciated that portions of the present invention may be implemented as a set of computer executable instructions (software) stored on or contained in a computer-readable medium. The computer readable medium may include a non-volatile medium such as a floppy diskette, hard disk, flash memory card, ROM, CD ROM, DVD, magnetic tape, or another suitable medium. Further, it will be appreciated by those skilled in the art that there are many alternative implementations of the invention described and claimed herein. It will be apparent to those skilled in the art having the benefit of this disclosure that the present invention contemplates the processing and encoding of network flows so that the encoded results accurately emulate the original network flows, but can be stored in significantly less memory than would otherwise be required for storing the original network flows. Once encoded, characteristics and attributes of the stored network flows may be examined and, if desired, manipulated to facilitate different network flows to be emulated. The stored network flows may be decoded and transmitted for purposes of testing network components. It is understood that the forms of the invention shown and described in the detailed description and the drawings are to be taken merely as presently preferred examples and that the invention is limited only by the language of the claims.

What is claimed is:

1. A network processor, comprising:
    a memory access module to retrieve a packet transmission data structure (PTD) from a memory accessible to the network processor;
    a PTD processing module to parse packet data from the PTD;
    a transmission module to transmit the data over the network as a network packet; and
    a control module to invoke the transmission module to transmit the packet data parsed from the PTD as a network packet; wherein the PTD processing module is further configured to parse at least one of:
        repetition information from the PTD and further wherein the control module is configured to invoke the transmission module to transmit a plurality of packets;
        transmission interval information from the PTD and wherein the control module is configured to use the transmission interval to control timing of consecutive invocations of the transmission module; and
        physical port information from the PTD and wherein the control module is configured to use the physical port information to influence the destination of the transmitted packet.

2. The network processor of claim 1, wherein the PTD processing module is further configured to parse packet data information from the PTD and wherein the control module uses the packet data information to inform the memory access module from where to retrieve the PTD.

3. The network processor of claim 1, wherein the PTD includes a packet data modification field containing an operation code and wherein the control unit interprets is enabled to modify the packet data based on the operation code.

4. The network processor of claim 3, wherein control unit recognizes a focused set of operation codes, wherein the focused set of operation codes is limited to approximately 10 or less operation codes.

5. The network processor of claim 3, wherein the control unit operation codes include an operation code an increment operation, a decrement operation, and a random number generate operation, a checksum generation operation.

6. The network processor of claim 5, wherein the PTD includes information indicating a portion of the packet data to be modified by the operation corresponding to the operation code.

7. The network processor of claim 6, wherein the PTD includes a response PTD field and wherein the network processor is configured to select a next PTD for processing based on a result on a transmission result determined for a preceding PTD and the value in the response PTD field.

8. A method of processing network packets comprising: retrieving a packet transfer data structure (PTD) from a memory; parsing a packet data portion of the PTD; transmitting the packet data portion of the PTD over a network; and modifying the packet data portion of the PTD according to an operation indicated in the PTD and transmitting the modified packet data portion over the network, wherein modifying includes an operation selected from the operations consisting of incrementing, decrementing, and random number generating.

9. The method of claim 8, wherein the PTD comprises a first PTD and retrieving the first PTD comprises retrieving a plurality of PTDs, the method further comprising, after transmitting the packet data portion, transmitting a packet data portion parsed from a second PTD.

10. The method of claim 9, further comprising, determining the second PTD as a next PTD to process based on flow control information indicated in the first PTD.

11. The method of claim 10, wherein the flow control information indicates a subsequent PTD and a criteria, wherein the criteria indicates a condition under which the subsequent PTD is processed next.

12. The method of claim 11, wherein the criteria includes determining whether the first PTD is successfully acknowledged.

13. The method of claim 11, wherein the criteria includes determining whether the first PTD is successfully acknowledged within a specified duration.

14. A network attached device, comprising a network processor (NP) and an NP memory accessible to the NP, wherein the network processor is operable to retrieve a packet transfer data structure (PTD) from the NP memory, wherein the PTD includes a packet data portion wherein the packet data portion is formatted for transmission as a network packet, and wherein the NP is operable to transmit the packet data portion over a network to which the network attached device is coupled one or more times and further operable to modify the packet data portion according to an operation indicated in the PTD and transmit the modified packet data portion as a network packet, wherein the network processor is operable to modify the packet data portion by incrementing or decrementing any portion of the packet data portion or by storing a random number into the packet data portion.

* * * * *